(12) United States Patent
Boone

(10) Patent No.: US 9,745,963 B2
(45) Date of Patent: Aug. 29, 2017

(54) ENERGY WEIGHT STORAGE

(71) Applicant: Daniel N. Boone, Blairsville, PA (US)

(72) Inventor: Daniel N. Boone, Blairsville, PA (US)

( * ) Notice: Subject to any disclaimer, the term of this patent is extended or adjusted under 35 U.S.C. 154(b) by 80 days.

(21) Appl. No.: 14/882,334

(22) Filed: Oct. 13, 2015

(65) Prior Publication Data

US 2016/0138572 A1    May 19, 2016

Related U.S. Application Data

(60) Provisional application No. 62/062,876, filed on Oct. 11, 2014.

(51) Int. Cl.
*F03G 3/00* (2006.01)
*F03G 3/04* (2006.01)

(52) U.S. Cl.
CPC ........ *F03G 3/00* (2013.01); *F03G 3/04* (2013.01)

(58) Field of Classification Search
CPC ...... F03G 3/00; F03G 3/02; F03G 3/04; F03G 6/00; F03G 7/00
See application file for complete search history.

(56) References Cited

U.S. PATENT DOCUMENTS

| 3,945,755 A * | 3/1976 | Gentile | F03B 7/006 |
| | | | 415/5 |
| 3,987,307 A * | 10/1976 | Giconi | H02K 7/1823 |
| | | | 198/711 |
| 4,030,300 A * | 6/1977 | Thompson | H02K 7/1823 |
| | | | 198/560 |
| 4,201,059 A * | 5/1980 | Feder | F03G 3/04 |
| | | | 185/33 |
| 2013/0081884 A1 * | 4/2013 | Li | F03G 3/00 |
| | | | 180/2.2 |

FOREIGN PATENT DOCUMENTS

| DE | 102007036099 A1 * | 2/2009 | ............. F03G 3/04 |
| DE | 102007062672 A1 * | 8/2009 | ............. F03B 13/06 |
| DE | 102011119116 A1 * | 5/2013 | ............. F03G 3/00 |
| IN | WO 2009101633 A2 * | 8/2009 | ............ F03B 17/005 |

* cited by examiner

*Primary Examiner* — Phillip A Johnson
(74) *Attorney, Agent, or Firm* — Gary P. Topolosky

(57) ABSTRACT

A first weight system for storing energy comprises a support platform with a lifting station having a plurality of vertically extending shafts, a cable and a motor located at ground level. This weight system hoists a heavily weighted device upwardly along the vertically extending shafts; holds it in a raised position and then lowers it along these same shafts to turn the motors and generate energy. The weighted device can include one or more flat rectangular containers or a weighted box. A second system employs a pair of containers connected to one another on an inclined track by a cable that can be moved about a guide wheel at a top of the track. The track further includes a media collection area, container filling area and means for conveying media from the bottom to the top of the inclined track. A third system pulls a plurality of large heavy wheels up an inclined track with wind power for subsequent lowering to turn a motor and generate energy.

19 Claims, 5 Drawing Sheets

ENERGY WEIGHT STORAGE

CROSS-REFERENCE TO RELATED APPLICATIONS

This is a perfection of Provisional Application Ser. No. 62/062,876, filed on Oct. 11, 2014, the disclosure of which is fully incorporated by reference herein.

FIELD OF THE INVENTION

The present invention discloses a variety of energy storage systems designed to store energy from any source, such as fossil fuel generation plants, hydroelectric installations, nuclear stations, wind farms, solar fields, and others. The energy is stored by means of raising heavy entities against gravity and holding them in storage when fully raised. When there is a demand for electricity, the heavy entities will be lowered and the resulting release of energy can run generators to supply the electrical grid. Since these energy storage systems all operate by "working against gravity" they will be referred to in general as "weight storage" systems, to distinguish them from other energy storage technologies, such as pumped hydro, compressed air, molten salts, batteries, etc.

BACKGROUND OF THE INVENTION

The most prominent obstacle to the successful development of renewable energy seems to be the lack of suitable and effective means of energy storage. There are even billboards sponsored by fossil fuel companies along US highways that castigate renewable energy because "the sun doesn't always shine and the wind doesn't always blow." In the *Scientific American* March 2012 article "Gather the Wind," (by Davide Castelvecchi), several wind and solar energy storage concepts are evaluated by a select panel of five experts. The technologies include pumped-hydro, compressed air, heat storage by fluids or molten salts, advanced battery designs, and home hydrogen storage. The technologies are evaluated by experts according to three criteria: 1. how well the technology can be scaled up, 2. the cost-effectiveness of installations, and 3. their efficiency of operation. In brief, none of the technologies fared well from the perspectives of these experts. Even pumped-hydro, the highest scorer in the rankings, faltered over the "lack of suitable sites," though it fares well as an efficient, cost-effective, and highly reliable method of energy storage (p. 50).

Boone U.S. Pat. No. 7,944,075 discloses energy storage systems using heavy weighted devices. There are essentially three distinct embodiments shown in that patent. They include, first, a large tank or container pulled up a central shaft by a cable. The ultimate power source of the cable is a wind turbine connected by means, such as a motor or direct-geared drive, to run a gearbox and pull the tank up with the cable. (FIG. 16 in that cited patent) Second, a heavy weight can be suspended over a vertical drop and likewise raised on a cable with similar means of motor or direct drive providing power from wind turbines to a gearbox. (FIG. 17) Third, it is possible to use railroad cars filled with a heavy medium that can be pulled up tracks on a steep incline. There will be storage tracks on a horizontal area at the top of the incline to store any number of railroad cars. In all three embodiments, it is then possible, when there is a demand for electricity, to lower the tank, heavy weight, or railroad cars with the cable and use the descending release of weight to drive a generator. (FIGS. 18 and 19)

That suggestion of using a direct mechanical drive by a wind turbine to power a gearbox means that there is no heavy generator in the nacelle and that the intermediate motor to run the gearbox is eliminated. It could lead to reduced costs in wind turbine design and installation and improved efficiencies in the system. All control of electrical generation and speed control to phase properly with the grid would take place at the output side when weight storage is deployed rather than a necessity for turbine operation.

OBJECTS OF THIS INVENTION

Weight storage systems have the potential to replace other energy storage technologies and may have distinct advantages such as better cost effectiveness, enhanced scalability, higher efficiencies, and less environmental impact. For example, pumped hydro installations are limited by water availability and the use of water in arid regions poses ecological problems. Weight storage systems use no water and therefore are more scalable and pose no environmental threats by water use. They potentially may also have equal cost-effectiveness and efficiencies as pumped hydro.

The present invention introduces new approaches to energy storage, which: rely on old and proven technologies, could be implemented immediately, and require no technological breakthroughs. In addition, they should be as efficient and reliable as pumped-hydro. Moreover, unlike pumped-hydro, weight storage is very widely deployable—systems utilizing the method could be set up anywhere, including in residential and urban areas. Most importantly, unlike pumped-hydro, the weight storage systems require no water source and could be deployed in arid regions where water is a precious commodity. The method is simply this: employ the hoisting of heavy entities to store the energy, which can then be recovered by allowing controlled descent of the weight to run electric generators. In essence, instead of pumping water to higher elevations, use excess wind and solar energy to raise large masses to higher elevations. Cable, chain, and winch systems, for example, can be used to hoist a variety of different weighted entities, some examples of which are outlined below. A cable, for example, could then engage generators when the weight is being lowered to release the stored energy at times of peak demand or at times when wind or solar energy is not available.

The fundamental paradigm of the concept is very simple and unsophisticated, and is not unlike many applications of added weights to balance or stabilize a hoisted system, such as inclined plane cars, elevators, and other industrial systems. However, instead of providing power to lift a heavy object that is then balanced by resisting weights, the heavy weights are themselves lifted by wind or solar power. Also, instead of the weights merely providing balance to an object, such as an elevator, the weights are then lowered to power generators. Of course, the scale and specific design of systems will be very "site-specific," depending on a number of topological and architectural features, in which elevation differentials are employed to use wind and solar power to lift heavy weights, and using the same tried-and-true work-against-gravity as the energy storage methodology. There are a large number of "lifting" technologies such as winches, cranes, elevator systems, inclined conveyor belts and buckets, hydraulic systems, gear toothed and levered or cabled combinations that could be enlisted with suitable modifications for weight-storage systems. It is feasible to deploy sufficient weight-storage facilities to create an energy infrastructure 100% dependent on just wind and solar sources.

Thus, with weight-storage, a totally renewable energy economy is within practical reach.

SUMMARY OF THE INVENTION

If the three embodiments disclosed in U.S. Pat. No. 7,944,075 are "Embodiments 1 through 3", the present invention discloses four new/additional weight storage embodiments to be referred to as "Embodiments 4 through 7." For all seven embodiments, the weight storage process may depend on obtaining power from a variety of sources, including present-day fossil fuel energy sources, nuclear power, hydroelectric installations, wind and solar energy capture, tidal or thermal energy technologies, or any other energy technology. Since demand for electricity is highly variable but since it is often desirable to maintain most energy generation processes at a somewhat constant output, or because some energy sources like wind and solar may be either cyclic or sporadic, energy storage is an important way to achieve greater reliability and consistency in meeting the demand for energy.

New Embodiment 4

Instead of the cylindrical container with a hole in the middle, sliding up and down a shaft, as is seen in FIG. 16 in the patent, there could be a rectangular container with four or more support shafts or girders, such as one supporting shaft at each corner. (FIG. 1)

New Embodiment 5

A framework could accommodate a vertical series of somewhat flat rectangular containers of lesser size and weight similar to Embodiment 4 but flatter. Each rectangular container could be hoisted in sequence and stored at the top of the framework until lowered to generate power. Having numerous flat containers of lesser weight decreases the size of motor(s) required to hoist each container. In addition, each framework could be readily placed adjacent to many other such frameworks to increase storage capacity of the system and comprise a "storage field." Perhaps think in terms of numerous structures like parking garages stacked side-by-side. The "floors" or horizontal sections of the structures would be moveable and slide up and down shafts, and can be stored at the top and bottom of the structure. The sections may be pulled up by cable/motor drives and lowered to drive the generation of electricity using the same hoisting-cable component. Or the sections could be lifted by hydraulic means and when the sections are lowered to produce energy, the hydraulic fluid would flow through piping to drive a generator. The numerous flat "floors" would be set up inside such a framework and would be stored above and then lowered one-at-a-time as needed. (FIG. 2)

A variation of this embodiment could be using the equivalent of an elevator shaft in a tall building in which large, heavy, flat "plate-like" units are hoisted, stored, and lowered by similar means to store energy until needed.

New Embodiment 6

While solid material cannot be pumped like water, there are somewhat analogous physical equivalents. High-angle or vertical-lift mine conveyors are able to transport materials like coal or iron ore up steep grades. In some respects, these are an analog to liquid pumps. Let us combine the mine conveyor technology with another familiar technology, the use of inclined plane cars or funiculars. Typical funicular installations involve a pair of tram cars (connected by a cable) that travel up and down inclined tracks. The pairing of the tram cars permits them to counterbalance each other. Imagine now, that there is the equivalent of a huge funicular that replaces the tram cars with a pair of very large solid material containers on wheels. The containers, connected by cable, counterbalance each other and travel up and down very large, heavy-duty tracks. Working in conjunction with this huge funicular is the equivalent of a very large high-angle mine conveyor. The system is designed so that an empty container at the top of the incline is gradually filled with sand or some other weighty medium by the conveyor. When full, the container can begin a controlled descent and drive a generator with the connecting cable. When reaching the bottom, the container is emptied into a large hopper reservoir which directly feeds the sand or heavy medium back onto the conveyor. The sand is then transported by the conveyor back up the incline to fill the previously empty second container that has reached the top. When the second container is filled, the process is repeated. Once again, the conveyor could be powered either by electricity from solar or wind sources or by direct mechanical drive of redesigned wind turbines. (FIG. 3)

A second variation would permit the conveyor to first fill a very large upper reservoir that holds much more than what a single container can carry, while the two containers are temporarily immobile. Then, when the reservoir is full and electricity is needed, it may alternately dispense the heavy medium into each empty container when it reaches the top. This would permit a process of continuous storing of energy by a period of constant and maximum transport of the medium, followed by an almost continuous release of energy at times of peak demand.

A third variation of this method would employ inexpensively manufactured (i.e., lower quality) ball bearings to achieve greater energy storage capacity with a denser material than sand, though at a greater initial cost. The higher cost may be offset in circumstances where space is at a premium, such as using the equivalent of an elevator shaft in a tall building for a weight-storage system. Also, using ball bearings in this way would lower the amount energy lost to friction in the process of moving the heavy medium, which would significantly increase the efficiency of the system.

New Embodiment 7

One could simplify the "rolling up an incline" methodology of Embodiment 3 by making the weights themselves into rolling wheels rather than having weighty loads transported on railroad cars or other wheeled conveyances. That is, imagine you have a steel-reinforced concrete roller that is in the neighborhood of 10 feet wide and 40 feet in diameter. To help the imagination along, imagine a huge can of tuna that has these dimensions, but instead of being filled with tuna is filled with concrete. The roller would have an axle through its center just like a big wheel to which a hoisting cable system could attach. The roller could then be towed up (again, by solar or wind generated electricity or direct mechanical drive from wind turbines) an appropriately shaped inclined plane/track also made of steel-reinforced concrete, perhaps even with exposed steel rails on which the roller could glide. Any number of such rollers could be compactly stored at the top of the incline, and then rolled back down the track one-at-a-time to release the stored energy when needed.

One immediately clear advantage of this system is that the weight requires no separate wheeled mechanisms like railroad cars to carry it. Railroad cars and presumably other wheeled carriers tend to be somewhat expensive. By comparison, filling a steel framework with concrete is relatively less expensive. Since the wheels could presumably be constructed and poured on site and immediately put into service, there would be no transportation issue. With these particular dimensions (10 feet wide×40 feet in diameter), assuming an approximate density of 150 pounds per cubic foot for steel-reinforced concrete, a wheel would weigh approximately 2,000,000 pounds. However, wheels could be made in any size, depending on practicalities of the location, engineering requirements of the hoisting mechanisms, and energy storage needs. (FIGS. 4, 5)

It might be thought that since many areas lack mountainous terrain, both the railroad car and heavy wheel embodiments might have few opportunities for deployment. Against this, it may be possible in many locations to make use of old, abandoned deep mines to create elevation differentials which are partially above ground and partially underground.

BRIEF DESCRIPTION OF DRAWINGS

Further features, objectives and advantages of the present invention will become clearer when referring to the following detailed description of preferred embodiments made with reference to the accompanying drawings in which.

DESCRIPTION OF PREFERRED EMBODIMENTS

Figure 1:
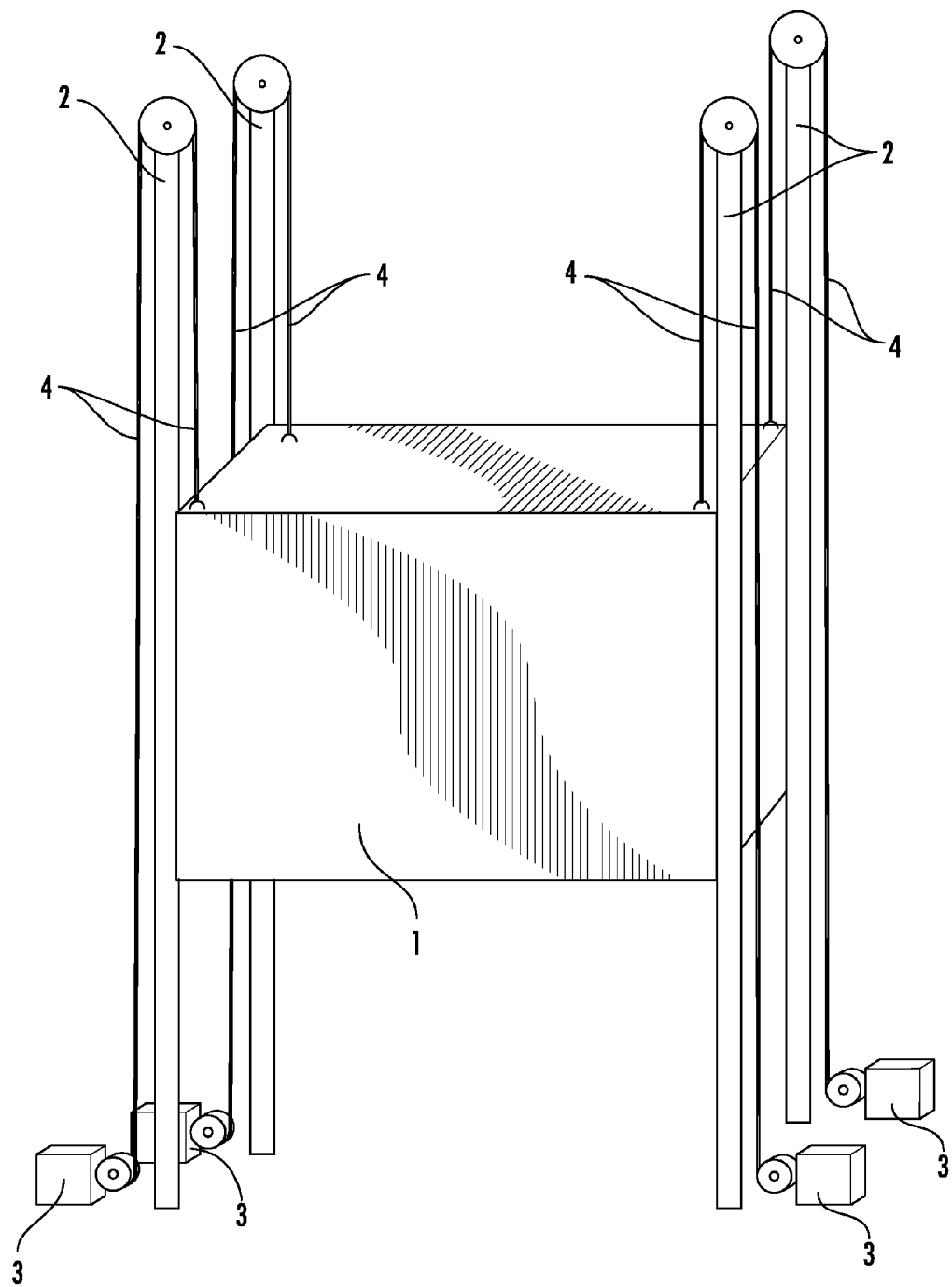
FIG. 1 is a front perspective schematic view showing a box-like rectangular tank supported at its corners by four shafts. Motors located at the ground level to each shaft include a winch system capable of hoisting the rectangular tank, which, after being fully raised, said tank may be lowered when needed to make the motors act as generators and produce electricity thereby.

FIG. 1 is a perspective schematic showing a rectangular tank 1 supported at its corners by four shafts 2. Motors 3 located at the ground level are each a synchronized winch system able to hoist the rectangular tank 1, which, when fully raised, may be lowered when needed to make the motors act as generators to produce electricity. The winch system uses cables 4 to raise and lower the rectangular tank.

Figure 2:
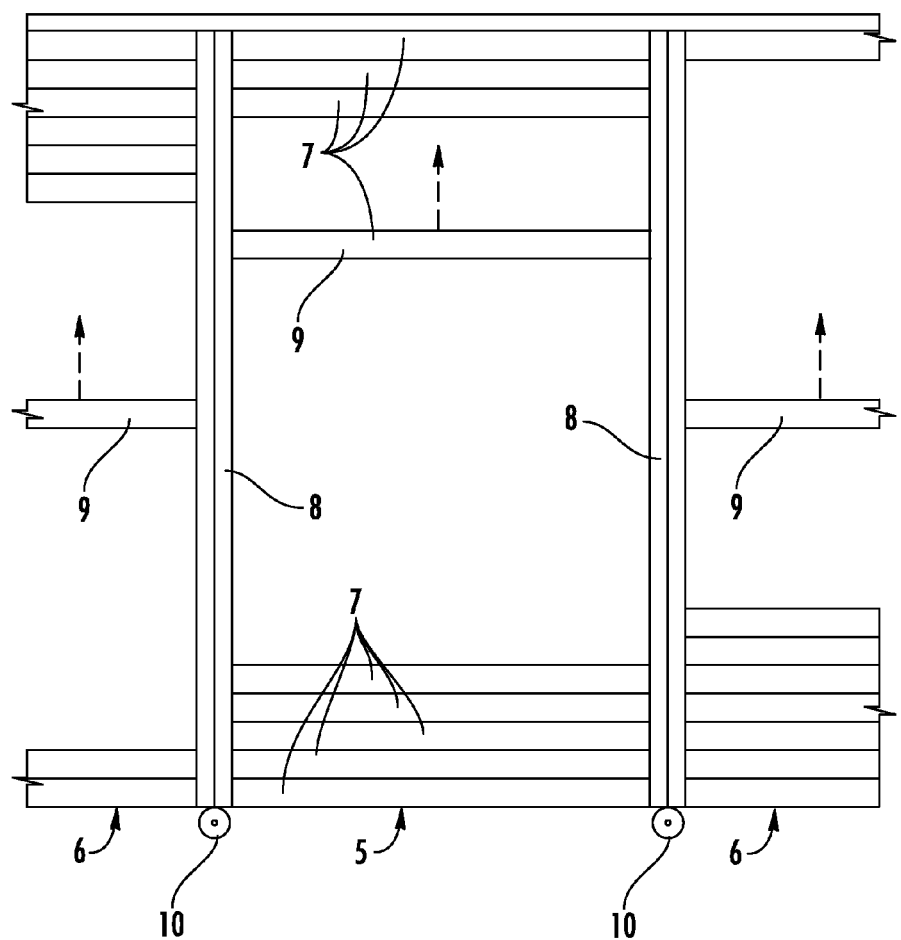
FIG. 2 is a front plan view, ground level schematic showing part of a weight storage framework. In the center is one main unit with an additional unit partially shown adjacent each side of this main unit consisting of very heavy, flat horizontal sections supported by framework shafts at each edge and corner. In each of these units, one flat section is shown being raised up to store energy. When all sections are raised at the top, they may be lowered when needed to generate electricity. What is indicated at the bottom of this FIG. 2 are means to raise or lower the flat sections. These devices may be winch and cable arrangements hidden in the girders and attached to the corners and sides of each section. Alternatively and/or additionally, there may be hydraulic piping and piston arrangements hidden in the corner girders.

FIG. 2 is a front view ground level schematic showing part of a weight storage framework. In the center is one unit 5 and another partially shown unit 6 is adjacent on each side. Very heavy, flat horizontal sections 7 are supported by the framework shafts 8 at each edge and corner. In each of the three units, one flat section is shown being raised up to store energy 9. When all sections are raised at the top, they may be lowered when needed to generate electricity. What is indicated in FIG. 2 at the bottom are means to raise or lower the flat sections 10. These devices may be winch and cable arrangements hidden in the girders and attached to the corners and sides of each section. Alternatively, there may be hydraulic piping and piston arrangements also hidden in the girders.

Figure 3:
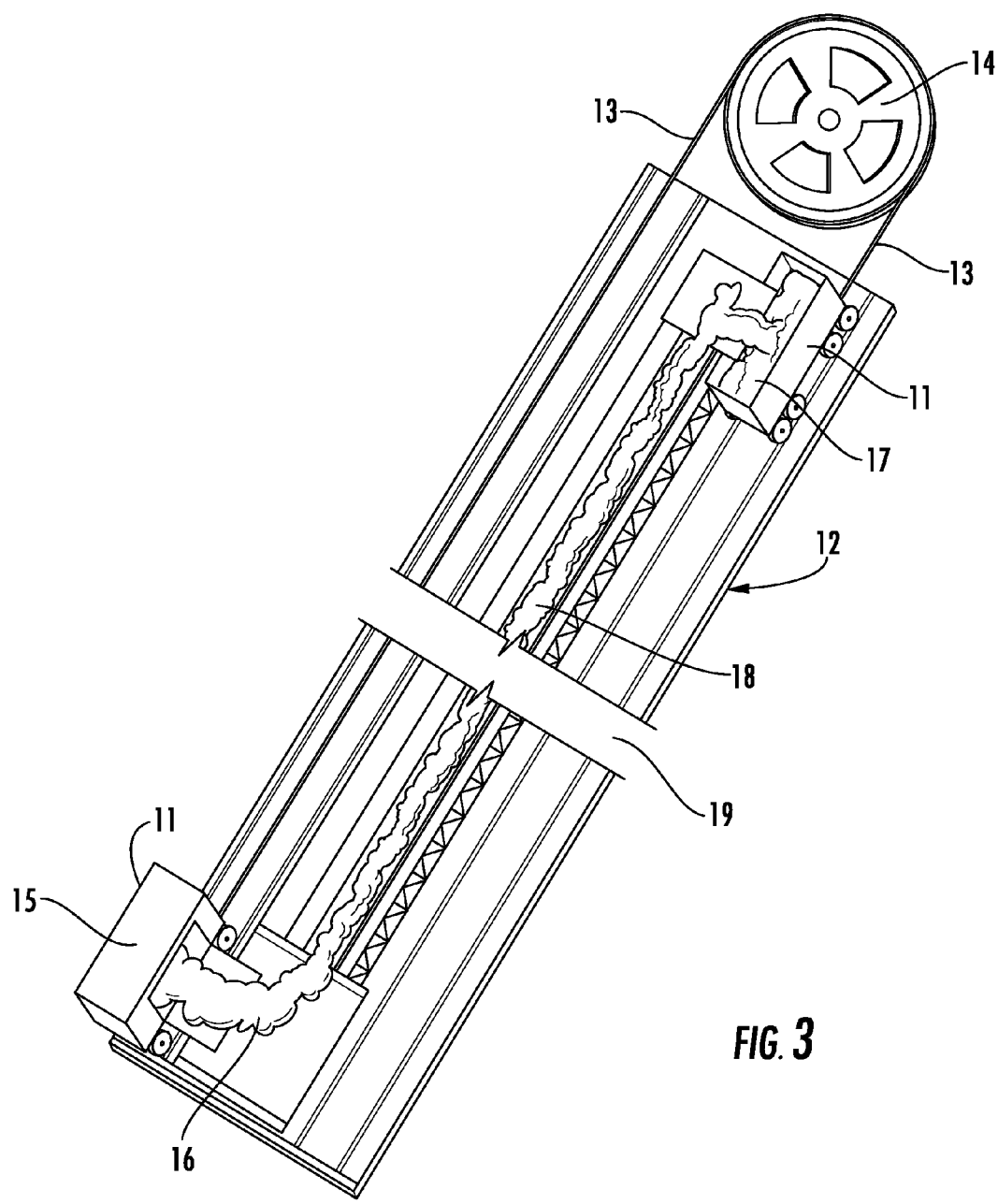
FIG. 3 is a top perspective schematic view showing a weight storage funicular in action. Therein, two large containers on a steep incline track are connected by a cable that moves through a guide wheel at the top. In the situation illustrated, a first container (the one on the left) has reached the bottom of the incline and is unloading its contents into a collection pit; the second (or right) container has reached the top and is being filled. A conveyor belt for carrying sand or another heavy medium extends from the bottom of the collection pit and up the center between the two container tracks. It is engaged to fill either "empty" container at the top of the incline. When the top container is full and the bottom container empty, the top container may begin a controlled descent that: (i) drives a generator connected to the guide wheel and (ii) produces electricity. The main track is depicted as broken since an installation of this sort might be hundreds or thousands of feet in length.

FIG. 3 is a perspective schematic showing a weight storage funicular in action. Two large containers 11 on a common, steep inclined track 12 are connected to one another by a cable 13 that moves through a guide wheel 14 at the top. What is shown is the situation in which one container on the left 15 has fully reached the bottom of the incline and is unloading its contents into a collection pit 16 at the bottom. The second container 17 has reached the top and is being filled. From the bottom of the collection pit 16 and up the center between the two tracks is a conveyor belt 18 carrying sand or another heavy medium and engaged in filling the container at the top. When the top container is full and the bottom container empty, the top container may begin a controlled descent that drives a generator connected to the guide wheel to produce electricity. The inclined track is depicted as broken, at marker 19, since an installation of this sort may be hundreds or even thousands of feet in length.

Figure 4:
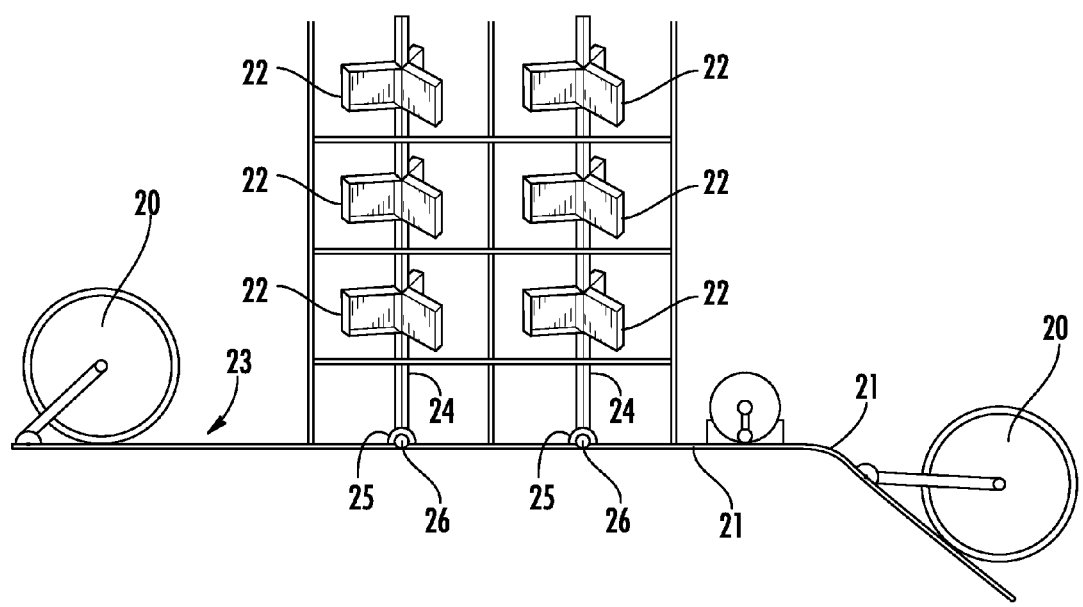
FIG. 4 is a side schematic view which shows the use of large heavy wheels pulled up their respective tracks by wind power as a representative power source. Any other useable power source may be used in place of or in combination with wind power to pull up the wheels of this embodiment. It is essentially the same as the railroad car methodology in the third embodiment, except that the rail (or railroad) cars have been replaced by a plurality of heavy wheels. When reaching the top of the incline, the wheels may be moved onto a horizontal section of track for storage until energy is needed.

FIG. 4 is a side view schematic showing the use of large heavy wheels 20 pulled up tracks 21 by wind power 22 (or any other usable power source, in the alternative). This is essentially the same as the railroad car methodology in the third embodiment, except that rail cars have been replaced with heavy wheels. When reaching the top of the incline, the wheels may be moved into a horizontal section of track 23 for storage until energy is needed. In this drawing is depicted the possibility of having torque from the vane rotation transferred within the shaft 24 to gear 25 and coupling 26 mechanisms that directly power a cable in each track (not seen in this figure) to raise the wheels. A generator (not shown) engages the cable when these wheels descend for producing electricity.

Figure 5:
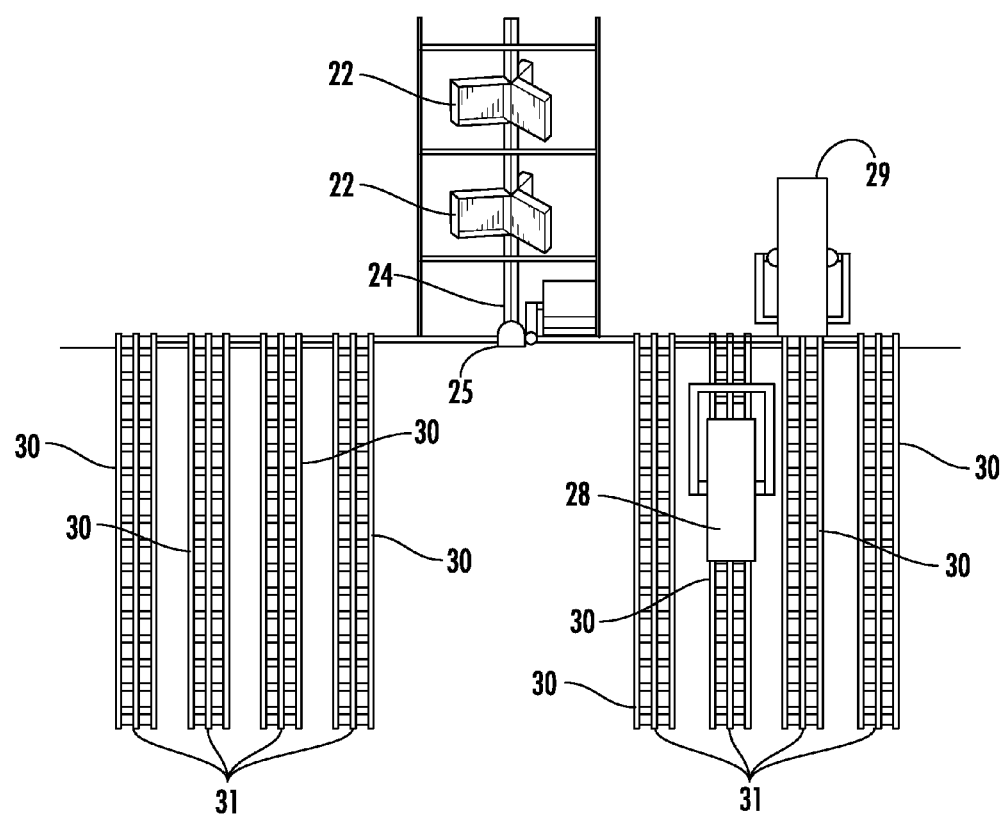
FIG. 5 is a front plan view showing an alternate variation of wind powered, wheel movers (FIG. 4). In this second variation, one heavy wheel 28 is shown in transit nearing the top of the incline with a second wheel 29 already placed in storage at the top of the system. Numerous tracks may accommodate varying numbers of heavy wheels in a major weight storage facility capable of storing many megawatt-hours of energy.

FIG. 5 is a front view schematic showing one heavy wheel in transit 28 nearing the top of the incline and one wheel already placed in storage at the top 29. Numerous tracks 30 may accommodate large numbers of heavy wheels in a major weight storage facility capable of storing many megawatt-hours of energy. In this figure it is more clearly seen that a cable runs down the center of each track 31. The wind turbines 22 in this case rotate a shaft 24 connected by a coupling mechanism 25 to the cables in each track, which permits the direct transfer of mechanical energy from the wind turbines to the cable to power the raising of the wheels. There are no electric generators in the wind turbines or electric motors using electricity generated by the wind turbine to operate the cable. Note also that a single large generator 27 is mechanically connected to all the tracks and cables and operated when wheels are in descent mode to produce electricity. Such a mechanical connectivity permits the use of a single generator and avoids the added expense of having numerous smaller generators located on each track and cable.

The foregoing description of the various exemplary embodiments of the invention is presented for purposes of illustration and disclosure. They are not intended to be exhaustive or to limit the invention to the precise form(s) disclosed. Many modifications and variations are possible in light of the above teaching. It is intended that the scope of the invention not be limited by this detailed description, but by the claims and the equivalents to the claims.

What is claimed is:

1. A weight system for storing energy comprising:
   (a) a support platform with a first lifting station having a plurality of vertically extending support shafts, each shaft having a cable and a motor located at ground level, the motor for each shaft connected to a synchronized winch; and
   (b) a container configured and disposed to be: (i) hoisted upwardly along the vertically extending shafts of the support platform; (ii) held in a raised position until a generation of energy is desired; and (iii) lowered along the vertically extending shafts to turn the motors and generate energy for storage.

2. The energy weight system of claim 1, which further includes means for raising the container to the raised position.

3. The energy weight system of claim 2 wherein the device raising means includes connection to a wind source, a solar source or combinations thereof.

4. The energy weight system of claim 1 wherein the container is box-shaped.

5. The energy weight system of claim 1 wherein the container includes a plurality of flat fillable boxes for hoisting individually or in groups.

6. The energy weight system of claim 1, which includes a plurality of lifting stations arranged adjacent one another.

7. The energy weight system of claim 6 wherein adjacent lifting stations share one or more vertically extending support shafts.

8. A weight system for storing energy comprising:
   (a) an inclined track;
   (b) a pair of containers connected to one another by a cable, said cable being capable of moving back and forth about a guide wheel at a top of the inclined track for effecting movement of a first container up or down the inclined track relative to movement of a second container up or down the inclined track;
   (c) a media collection area at or near a bottom of the inclined track for receiving a media from inside the first container;
   (d) a container filling area at or near a top of the inclined track for temporarily storing the media inside the second container; and
   (e) means for conveying media from the media collection area, up the inclined track and to the container filling area.

9. The energy weight system of claim 8 wherein the guide wheel is connected to a motor that generates and stores energy with relative movement of the first container and the second container along the inclined track.

10. The energy weight system of claim 8 wherein the first container and the second container are open-topped railroad cars.

11. The energy weight system of claim 8 wherein the first container and the second container are counter-balanced to one another.

12. The energy weight system of claim 8 wherein the media is sand, a powdered material or a coarse material like gravel.

13. The energy weight system of claim 8 wherein the media includes a plurality of ball bearings.

14. A weight system for storing energy comprising:
    (a) an inclined track; and
    (b) a first lifting station that includes a rolling wheel connected to a cable, said first lifting station capable of being: (i) pulled up the inclined track by an external power system; and (ii) lowered down the inclined track to turn a motor and generate energy for storage.

15. The energy weight system of claim 14 wherein the first lifting station further includes a section of horizontal track for storing the rolling wheel until needed for lowering.

16. The energy weight system of claim 14 wherein the external power system includes connection to a wind source.

17. The energy weight system of claim 14, which includes a plurality of lifting stations arranged adjacent one another.

18. The energy weight system of claim 14 wherein adjacent lifting stations share one or more sections of the inclined track.

19. The energy weight system of claim 14 wherein adjacent lifting stations share one or more sections of horizontal track.

* * * * *